June 2, 1925.
T. M. DEVINE
1,540,109
AUTOMOBILE BRAKE MECHANISM
Filed Aug. 20, 1921    2 Sheets-Sheet 1
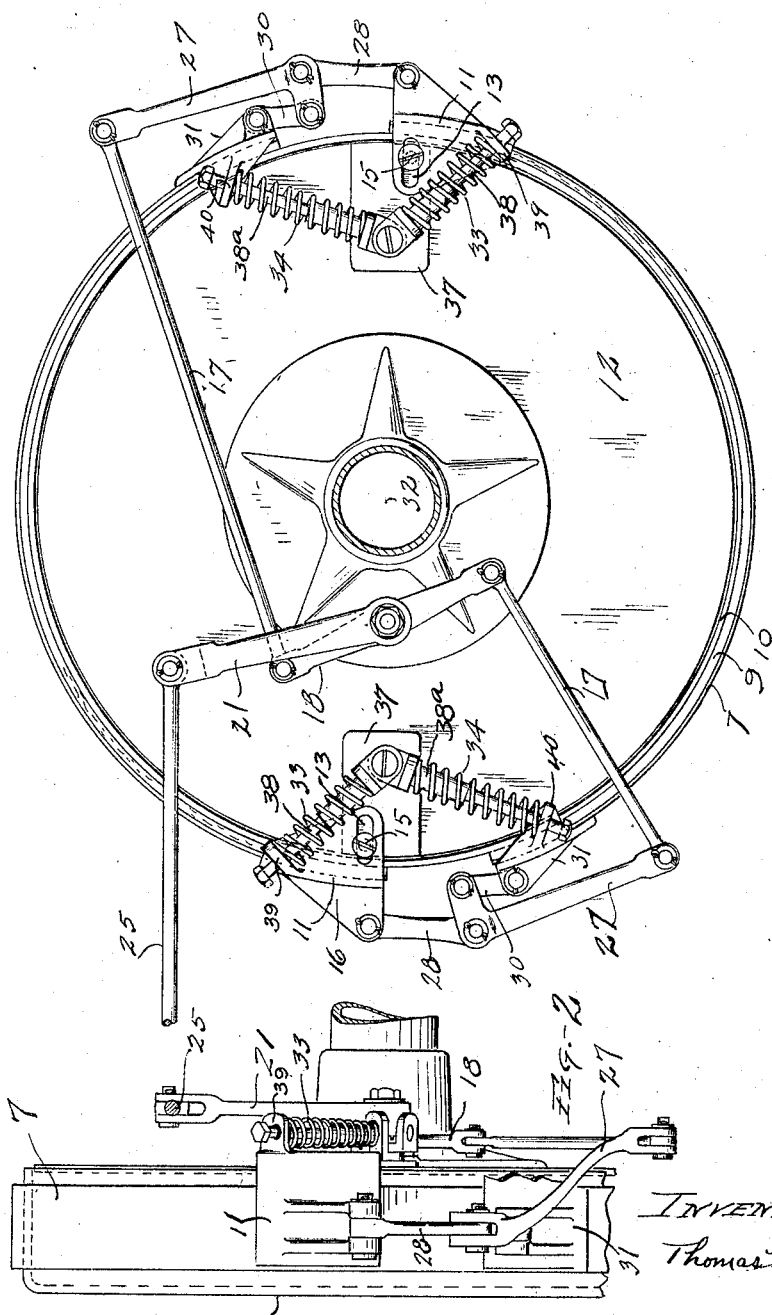

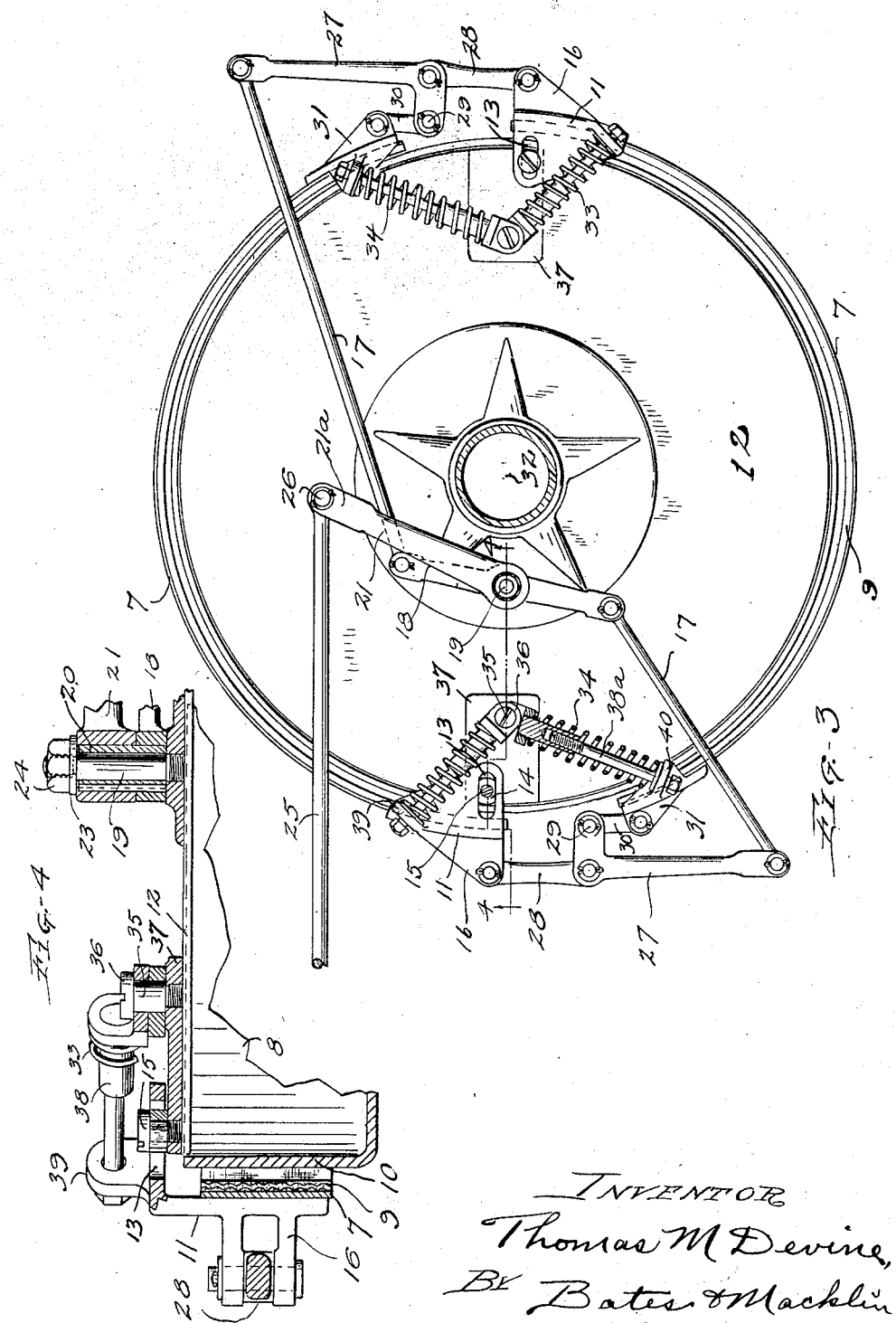

Patented June 2, 1925.

1,540,100

UNITED STATES PATENT OFFICE.

THOMAS M. DEVINE, OF CLEVELAND HEIGHTS, OHIO.

AUTOMOBILE BRAKE MECHANISM.

Application filed August 20, 1921. Serial No. 493,778.

*To all whom it may concern:*

Be it known that I, THOMAS M. DEVINE, a citizen of the United States, residing at Cleveland Heights, in the county of Cuyahoga and State of Ohio, have invented a certain new and useful Improvement in Automobile Brake Mechanism, of which the following is a full, clear, and exact description, reference being had to the accompanying drawings.

This invention is directed to improvements in brake mechanism, and is more particularly concerned with automobile brakes of the friction band type.

In the construction of automobile brakes, it is customary to provide two sets of brakes which may be operated selectively. These brake sets are usually comprised of a brake drum and an inner and outer brake adapted to bear upon the inner and outer circumferential surfaces of the drum. The outer brake band usually serves as a utility or service brake, while the inner brake band is generally used only in case of emergency. The usual practice in constructing the outer brake is to arrange a flexible steel band having a suitable lining of fibrous material substantially around the entire circumference of the drum and which is adapted to be contracted onto the drum by a suitable control or pedal positioned at the driver's seat. One end of the band is secured to the axle housing of the automobile while the other end is secured to suitable linkage connected to the driver's control lever. A spring associated with the linkage serves to expand the band out of contact with the drum surface when the brake is released.

In this type of automobile brake it is frequently necessary to renew the brake lining which necessitates the removal of the wheels. Another objection to this arrangement is that the flexible metallic band or shoe, while initially arranged to support the lining with a slight clearance between the lining and the surface of the brake drum becomes permanently distorted and permits the lining to continuously rub on the brake drum when the brake is not in use. This consequently results in a premature destruction of the brake lining. As the leverage reduction from the driver's control to the brake levers is very great the clearance space between the drum and lining is necessarily limited as an increase in this clearance would require a considerably greater movement of the driver's control lever.

The general object of my invention therefore, is the provision of an automobile brake of simple and durable construction wherein the brake lining may under all conditions be supported with a uniform clearance between the lining and the drum surface. Another object is the provision of novel mechanism arranged to constrict two separately mounted portions of the lining upon the drum surface to render effective braking action with a minimum application of manual force.

A more specific object of my invention is concerned with the provision of brake mechanism that may be conveniently removed from an automobile without necessitating the removal of the wheels.

Other objects will become apparent from a description hereinafter set forth referring to the accompanying drawings which illustrate a preferred embodiment of my invention; and the essential characteristics are summarized in the claims.

In the drawings, Fig. 1 is a side elevation of my device with a pair of independently mounted brake shoes contracted upon a brake drum; Fig. 2 is a fragmentary end elevation of the same; Fig. 3 is a view similar to Fig. 1 but illustrating the position of the brake shoes and various parts of the mechanism in normal inoperative position; Fig. 4 is a cross sectional view of the drum and part of the mechanism taken substantially along the line 4—4 of Fig. 3.

Considerable difficulty has been experienced with brake mechanism wherein the brake lining is carried by a brake shoe extending substantially around the circumference of the brake drum for the continuous use of the brake mechanism causes the permanent setting of the band or shoe which supports the lining. In a great many cases the lining rests in contact with the rotating drum surface when the brake mechanism is not in use. As it is impractical to provide any considerable clearance between the brake drum and the brake lining due to the multiplication of the lever ratios from the driver's position to the drum, it is evident that in any successful brake mechanism the brake lining should be maintained out of contact with the drum with very slight clearance therebetween.

To meet this requirement, I have replaced the usual circular band with a pair of flexible bands 7, each extending substantially half way around the brake drum 8. These brake bands or shoes may have a suitable brake lining 9 rigidly secured to the inner faces thereof which is adapted to bear upon the flange portion 10 of the drum 8 when the mechanism is contracted. I have provided pivotal mountings 11 rigidly secured to the diametrically opposite ends of these shoes which may preferably serve a three fold purpose, namely, a connecting member between the band and contracting linkage, a thrust member for raising the lining out of contact with the drum and as a pivot bearing for the brake bands as will be hereinafter described.

As a pivot bearing these members are adapted to coact with and slide on a pivot block 14 mounted on a pivot stud 15 carried by a supporting flange 12 rigidly secured to the rear axle housing of the automobile.

For bringing the brake lining carried by the shoes into contact with the brake drum, I have provided link mechanism comprised substantially of a rocker lever 18 suitably mounted on a stud 19 which is rigidly secured to the flange 12. The lever 18 may be rigidly mounted on a suitable sleeve 20 upon which a second lever 21 may also be rigidly mounted. This sleeve with the levers mounted thereon may be retained in position by any suitable means such as a suitable washer 23 and a lock nut 24. A tension rod 25 extending to a control lever (not shown) may be pivotally connected to a bifurcated end 21ª of the lever 21 by a suitable pin 26. Both ends of the rocker lever 18 may be connected to offset bell crank levers 27 by connecting rods 17, while the bell cranks may be connected to the brake shoes by links 28 which are pivotally supported by the projecting bearing lugs 16 integral with the members 11.

To obtain the proper binding movement of the brake shoes onto the drum, I have arranged link connections 29 on the inwardly extending short arms of the bell crank levers in such a manner that the pivot centers of the bell cranks shift slightly toward the drum surface. Suitable links 30 connected to the short arms of the bell cranks may be pivotally joined to end members 31 rigidly secured to the other ends of the brake shoes, hence when the brake mechanism is in operation members 31 will be drawn toward the pivot blocks 14.

From the foregoing description it is to be seen that as the rod 25 is drawn outwardly toward the front of the machine by the driver's control lever, the long arms 27 of the bell cranks will be drawn inwardly toward the rear axle center 32 by the rods 17; the links 28 serving as a floating bearing support for the bell cranks when the brake bands are brought into action by the movement of the bell cranks and connecting links 30.

To maintain the brake shoes and the lining in normal clearing position out of contact with the drum and with the uniform clearance therebetween, I have provided elongated bearing slots 13 to permit an outward shifting of the pivotal end of the brake bands. This outward shifting movement may be obtained by a resilient member 33 maintained in position by a suitable guide member 38 pivotally secured to a reinforcing plate 37 carried by the brake support flange 12. A similar guide member 38ª associated with the other end of the brake band having a common pivotal center 35 with the guide member 38 may serve to retain a resilient member 34 in position. These resilient members serve to shift the band out of contact with the drum when the brake mechanism is released. The angular relation of these members with respect to the ends of the bands is such that the force exerted thereby upon the bands while being sufficient to normally maintain the brake lining out of contact with the drum surface, may be readily overcome by the lever mechanism without appreciably detracting from the power exerted thereby upon the brake shoes. The outer ends of the resilient members 33 and 34 may bear upon suitable lugs 39 and 40 formed integrally with the end members 11 and 31 respectively. As the pivotal centers of the bell cranks 27 and the links 28 and 30 are not definitely fixed, it is to be seen that the brake mechanism will readily adjust itself to the various regulations involved when the brake mechanism is brought into action.

It is likewise to be seen that an easy outward releasing movement of the brake shoes is also obtained when the brake mechanism is released. Furthermore, by thus providing shifting movement for the pivotal center of the brake shoes, it is possible to utilize the entire surface of the lining with full force upon the drum surface, while on the other hand, the lining may be uniformly raised out of contact with the drum surface when the brake mechanism is inoperative. The linkage and lever arrangement is such that a great multiplication of power may be obtained from the driver's control lever to the links connecting the brake bands with the bell crank levers.

Fig. 3 illustrates the position of the parts when the vehicle is running. The brake is applied by a pull on the rod 25 which rocks the lever 18 and pulls the two rods 17, thus rocking the bell cranks 27 and pulling the links 30 toward an intermediate diametric plane and at the same time pulling the links 28 in the opposite direction. The pull on the links 30 draws the band lengthwise of itself while the pull on the links 28 results in an inwardly sliding movement of the mountings 11. This brings the two bands into tight engagement with the brake drum at each end of the band and intermediately as illustrated in Fig. 1. Upon release of the constraint on the rod 25, the springs 33 and 34, which were compressed by such action, react and force the mountings 11 and the opposite ends of the brake bands away from the drum.

Having thus described my invention, I claim:—

1. In an automobile, a brake mechanism having in combination a brake drum, a pair of brake shoes having brake lining mounted thereon, a support rigid with the rear axle housing upon which said brake shoes are pivotally and slidably mounted and resilient means for moving each end of each brake shoe away from the drum.

2. In an automobile brake mechanism, the combination of a brake drum, a pair of brake shoes having brake lining mounted thereon, resilient members associated with each end of each brake shoe for normally maintaining the brake shoes in non-brakable position, and means for compressing said resilient members and for constricting the brake lining carried by said shoes upon the brake drum.

3. In an automobile, a brake mechanism having in combination a brake drum, a pair of brake shoes, brake lining mounted thereon, a support rigid with the rear axle housing upon which said brake shoes are slidably mounted, and resilient means for moving one end of one brake shoe and the substantially diametrically opposite end of the other brake shoe in a transverse direction.

4. In an automobile brake mechanism, the combination of a rigid support, a brake drum, a pair of brake shoes, a plurality of resilient members one associated with each end of each brake shoe for normally maintaining the brake shoes in non-brakable position, and means for compressing said resilient members and for constricting the brake shoes upon the brake drum.

5. In a brake mechanism, the combination with the brake drum, of a pair of brake shoes, means for slideably supporting two ends of two shoes at opposite sides of the drum, and means for shifting said ends in a direction transverse to the drum surface and shifting the other two ends of the two brake shoes in a circumferential direction.

6. In an automobile, a brake mechanism having in combination a brake drum, a supporting member rigidly connected to the rear axle housing of the automobile, a pair of brake shoes having their diametrically opposite ends pivotally and slidably mounted on said support and guide members having a common pivotal center on said support adapted to maintain resilient members in association with the ends of each brake shoe, whereby the shoes may be raised out of contact with said brake drum upon the releasing of the brake mechanism.

7. In an automobile brake mechanism, the combination of a brake drum, a support, a pair of brake shoes mounted on the support and expanding means positioned at each end of each brake shoe for raising the brake shoes out of contact with the drum surface.

8. In an automobile brake mechanism, the combination of a brake drum, a support, a pair of semi-circular brake shoes extending around the outer surface of the drum having pivotal and slidable connections with said support in diametrically opposite positions and means for drawing the brake shoes onto the drum including connecting links associated with bell crank members supported by said brake shoes.

9. In an automobile brake mechanism, the combination of a brake drum, a support, a pair of semi-circular brake shoes extending around the outer surface of the drum having pivotal and slidable connections with said support in diametrically opposite positions, means for drawing the brake shoes onto the drum including bell crank members associated with connecting links supported by said brake shoes, and means carried by the support for shifting said levers and brake shoes to an inoperative position.

10. In an automobile, a brake mechanism having in combination a brake drum, a support rigidly secured to the rear axle housing, a pair of brake shoes having their ends pivotally mounted on said support, a pair of bell crank members linked to the ends of said brake shoes, a rocker lever pivotally mounted on said support, members connecting the ends of said rocker lever with said bell cranks and mechanism controlled from the driver's position on the automobile for operating said bell cranks connecting links, and rocker lever whereby said brake shoes may be constricted about the outer surface of said brake drum.

11. In an automobile brake mechanism, the combination of a brake drum, a pair of brake shoes, a support having slidable and pivotal connections for each of said brake shoes, and means for shifting each adjacent pair of ends of the two brake shoes in a circumferential and transverse direction to the drum surface.

12. In an automobile brake mechanism, the combination of a brake drum, a support, a pair of semi-circular brake shoes extending around the outer surface of the drum slidably connected to said support to permit radial movement but effectively anchored against circumferential movement and means for drawing the brake shoes onto the drum including connecting links pivotally secured to the brake shoes and associated with bell crank members having floating pivotal centers.

13. In an automobile brake mechanism, the combination of a brake drum, a support, a pair of flexible brake bands mounted on the support, contracting means positioned at each end of each band for drawing the band onto the drum surface, and expanding means positioned at each end of each band for raising the band from the drum surface.

14. In a brake mechanism, the combination of a brake drum, a support, a pair of flexible brake bands mounted at opposite ends on the support, contracting means positioned at each end of the each brake band for drawing one end inwardly and the other circumferentially to apply the brake.

15. In a brake mechanism, the combination of a brake drum, a support, a pair of flexible brake bands mounted at opposite ends on the support, contracting means positioned at each end of each brake band for drawing one end inwardly and the other circumferentially to apply the brake, and resilient means adapted to move each end of each brake band to free it from the drum surface.

In testimony whereof, I hereunto affix my signature.

THOMAS M. DEVINE.